United States Patent [19]

Gormanns et al.

[11] Patent Number: 5,043,123
[45] Date of Patent: Aug. 27, 1991

[54] METHOD AND APPARATUS FOR MANUFACTURING FINISHED PARTS AS COMPOSITE BODIES FROM PULVERULENT ROLLING MATERIALS

[75] Inventors: Theodor Gormanns, Erkelenz; Siegfried Radewahn, Mönchen-Gladbach; Walter Solty, Hückelhoven, all of Fed. Rep. of Germany

[73] Assignee: Mannesmann Aktiengesellschaft, Düsseldorf, Fed. Rep. of Germany

[21] Appl. No.: 528,240

[22] Filed: May 24, 1990

[30] Foreign Application Priority Data

May 24, 1989 [DE] Fed. Rep. of Germany ....... 3917277

[51] Int. Cl.⁵ .............................................. B29C 43/30
[52] U.S. Cl. .................... 264/113; 264/120; 419/6; 419/10; 419/38; 419/66; 425/78; 425/150; 425/167; 425/352; 425/356; 425/412
[58] Field of Search ............. 264/113, 120; 419/5, 419/6, 10, 14, 38, 66, 68; 425/78, 167, 352, 354, 355, 356, 412, 414, 150

[56] References Cited

U.S. PATENT DOCUMENTS

| | | | |
|---|---|---|---|
| 1,352,457 | 9/1920 | Kempton | 425/356 |
| 2,398,227 | 4/1946 | Hubbert | 425/167 |
| 2,509,783 | 5/1950 | Richardson | 425/167 |
| 3,166,617 | 1/1965 | Munk | 425/352 |
| 3,255,278 | 6/1966 | Smith | 264/113 |
| 3,664,785 | 5/1972 | Marshall et al. | 425/414 |
| 4,419,413 | 12/1983 | Ebihara | 428/548 |

FOREIGN PATENT DOCUMENTS

| | | | |
|---|---|---|---|
| 56-134099 | 10/1983 | Japan | 425/352 |
| 60-258401 | 12/1985 | Japan | 419/6 |
| 1026958 | 7/1983 | U.S.S.R. | 419/6 |
| 1423279 | 9/1988 | U.S.S.R. | 425/78 |

Primary Examiner—Mary Lynn Theisen
Attorney, Agent, or Firm—Cohen, Pontani Lieberman

[57] ABSTRACT

The present invention relates to a method and apparatus for the manufacture of finished parts by the sintering of compacts which are formed as composite moldings of a pulverulent base material and at least one other pulverulent material, particularly different metal powders. The compacts are produced in the manner that at least one of the powder materials is introduced in pourable condition directly alongside of an already pre-compacted part of the compact into the mold which has a shell-shaped matrix and the powder materials are subjected together to final compacting by plug forces acting from on top and on bottom to the size desired for the sintering. In order to improve the traditional method so that moldings with vertically extending separation lines between the individual portions of the composite material can be produced without the previous disadvantages and provide an apparatus on which the compacts can be produced in accordance with this method, at least two powder materials are introduced, one after the other, in pourable condition into the individual regions of the filling volume of the mold which are to be opened, at least one pre-compacting of the powder material already introduced being affected until dimensional stability is obtained before the next powder material is introduced alongside of the pre-compacted material and is pre-compacted in similar manner, and that only then is the joint final compacting effected.

8 Claims, 3 Drawing Sheets

METHOD AND APPARATUS FOR MANUFACTURING FINISHED PARTS AS COMPOSITE BODIES FROM PULVERULENT ROLLING MATERIALS

FIELD OF THE INVENTION

The present invention relates to a method of producing finished parts by the sintering of compacts which are formed as composite moldings from a pulverulent base material and at least one other pulverulent material, particularly from different metal powders, carbides and/or oxides. The compacts are produced in a mold cavity enclosed by a matrix on which at least one top plug and one bottom plug exert a pressing action in axial direction of the compact. The powder materials are introduced one after the other in pourable condition into the mold cavity. The powder material which is first introduced fills only a part of the mold cavity and, after the filling, is pre-compacted by the top and bottom plug or plugs to form a partial molding. The partial molding has a green strength which is sufficient for the pulling back of the press plugs without damage to the partial molding. Thereupon at least one other powder material is introduced into the part of the mold cavity not filled by the pre-compacted partial molding. Finally, the powdered materials introduced are subjected as a whole to a final compacting. An apparatus for the production of such compacts is also provided.

BACKGROUND

From Federal Republic of Germany 32 06 981 C2, a method for the compression molding of molded parts from, for instance, sintered metal powders is known in which the molded parts are formed of different material in separate regions (composite moldings). In that method, the mold cavity formed by the matrix and the bottom plug, when in a first filling position, of a compression mold is first filled flush with the surface by a first powder material. The mold cavity is then enlarged further by lowering the bottom plug into a second filling position, whereupon it is filled again, flush with the surface, by a second powdered material. Since the lower part of the matrix has a step which protrudes into the inside of the mold and with respect to which the bottom plug is lowered, the enlargement of the mold cavity is developed in the shape of a trough in accordance with the slope curve of the first powder.

Therefore, the line of separation between the two types of powders can always only be in the form of this slope curve. This means that vertical lines of separation between the materials cannot be obtained at all by this method. Molded parts in the shape, for instance, of gear wheels in which the actual wheel body is to consist of a simple structural steel and only the comparatively narrow zone of the toothing region is to be formed of a high-alloy wear-resistant steel cannot be produced with it.

This limitation is no longer present in the case of the method of manufacturing composite moldings from two different alloy powders known from Federal Republic of Germany 33 05 879 A1. That result is achieved in the manner that a preform of the first alloy powder is inserted into the compression mold, the remaining base of the mold is filled with the other alloy powder, and the two powders are finally compressed together to form the desired molded part. The preform must, for this purpose, have a dimensional stability which is sufficient for handling. For this reason, a resin binder is first of all added to the alloy powder in question. The powder is then formed in a core shooter, which is known from foundry technology, with mechanical compression, into the preform. These preparations therefore are carried out outside of the mold in which the actual composite molded body is produced. This results not only in a corresponding handling expense for bringing the different materials together but also in the providing of a core shooter. Furthermore, there is the disadvantage that the resin binder must be burned out from the compacted molding before or during the final sintering.

From U.S. Pat. No. 4,353,155 it is known to manufacture a molded body formed of two layers of different powdered metal materials, namely a bronze layer and an iron layer, for use as plain bearing. In this case, the iron powder is first of all introduced into a cylindrical mold cavity, formed by a matrix into which a center pin has been coaxially introduced. The center pin which is developed with steps and is of small diameter at its upper part is pulled out after the filling, displacing part of the iron powder which has already been introduced. This displaced part must, first of all, be removed before a pre-compacting of the iron powder in the matrix is effected by compressing the powder charge between an upper plug and a lower plug. The upper plug has a central bore into which the upper part of the center pin is slidingly introduced. During the compression process, the pressing surface of the upper plug is always flush with the upper end surface of the matrix and therefore does not dip into the mold cavity of the matrix. The latter takes place only in the case of the lower plug. When a sufficient green strength has been reached, and therefore the pre-compact produced no longer falls apart upon the removal of the center pin, the center pin is moved downward to such an extent that its upper part of smaller diameter lies coaxially within the pre-compact. In this way there is produced an open mold space between the pre-compact and the center pin, which cavity is filled with the bronze powder. Thereupon, the final compressing of the compact is effected by the action of upper and lower plugs on the entire mass of powder, the compact being sintered in known manner after removal from the mold.

This method has considerable disadvantages. First of all, the introduction from one side of only the lower plug into the mold cavity upon the production of the pre-compact leads to a pre-compacting which is nonuniform in the direction of compression as a result of the friction between the column of powder and the walls of the matrix. Furthermore, the handling of the powder is very cumbersome since the remaining quantity of the powder which has been pressed out of the matrix, which quantity differs depending on the filling factor, must be removed. For this purpose, the quantity of powder can be blown away, for instance, by compressed air or be swept away by hand with a broom.

Both increase the cost of manufacture of the compacts. If it were desired simply to push the excess powder away after the effecting of the pre-compacting, this would be possible only with the center pin withdrawn, and therefore with the mold space for the bronze powder open. Accordingly, a part of the iron powder would drop into this mold space and lead to "material contamination" there. Furthermore, there is the disadvantage that the relative compacting in the two powder layers must necessarily come out differently upon the joint final compacting since the height of the mold space for the bronze powder is less than that for the iron powder, namely corresponds precisely to the height of the pre-compact and, accordingly, the pressing paths are also different. In the manufacture of plain bearings, this is permissible or even desired since an open pore structure of the bronze layer can favor the lubricating properties. For the manufacture of parts of the highest possible density and, in particular, approximately the same relative compression in the individual layers of material, this method is unsuitable. Nor is this method suitable for purposefully establishing desired degrees of compaction in the individual layers of material since the height of the mold space for the bronze powder can never be greater than the height of the pre-compact which is to be established for the minimum green strength. Furthermore, this method does not permit the production of composite layer bodies having more than two layers of material.

It is therefore the object of the present invention to improve a method of this type in such a manner that molded parts having vertically extending separation lines between the individual portions of the composite material can be produced without the disadvantages described, and therefore with any relative compression and, in particular, with practically the same relative compression. Furthermore, there is to be created an apparatus on which the compacts can be produced in accordance with this method.

SUMMARY

In accordance with the invention, the pre-compacted partial molding is produced in the manner that top and bottom plugs are pressed relative to the matrix uniformly in opposite directions into the part of the mold cavity filled by the first powder material. Before the introduction of the second powder material, with the top plug or plugs retracted, the upper end surface of the pre-compacted partial molding is brought flush with the upper end surface of the matrix. Thereupon a bottom plug which can be displaced independently of an optionally present center pin which up to then filled the mold cavity intended for the second powder material is brought with its pressing surface into its filling position below the upper end surface of the pre-compacted partial molding. After the introduction of the second powder material, a pre-compacting of the second powder material is effected with simultaneous action of this bottom plug and of the top plug or plugs. Thereupon other powder materials are possibly introduced one after the other in corresponding manner and pre-compacted before the next powder material is introduced. Finally, the joint final compacting of the powdered materials introduced is effected.

In order to obtain the same relative compacting in the different layers of material of the finally compacted compact, each of which has the same molding height, the bottom plug, which up to that time filled the mold cavity intended for the second or further powder material, is preferably brought with its pressing surface into a filling position below the upper end surface of the pre-compacted partial molding.

Alternatively, after the introduction of another powder material and before the pre-compacting thereof, the top and bottom plugs corresponding to the pre-compacted partial molding are so displaced together in regulated manner, resting against the end surfaces of the partial molding, until the center of gravity of the partial molding has reached a position in height relative to the center of gravity of the powder column of the other powder material, which corresponds to the desired position in height of the two centers of gravity with respect to each other in the finally compacted molding, and that only thereupon is the pre-compacting effected, the top and bottom plugs corresponding to the column of powder of the other powder material being moved in each case by the same path into the column of powder.

For producing finished parts of substantial symmetry of rotation, having a thick-walled inner hollow cylindrical annular body of the base material and a comparatively thin-walled outer annual body of another material surrounding same, the filling volume of the outer annular body is filled and pre-compacted and only thereupon is the filling volume of the other annular body filled and also pre-compacted.

As base material there is preferably used an unalloyed or low-alloy steel powder and as further material a high-alloy steel powder or an oxide or carbide embedded in a metallic matrix or a memory metal.

The invention also includes an apparatus for producing compacts according to the above methods, said apparatus having a press mold which has a matrix into which at least one upper plug and at least one lower plug can be introduced for the compacting of the compacts. The bottom plug surface is divided into at least two bottom plugs, the respective pressing surfaces of which correspond to the cross-sectional area of a given powder column of one of the materials of the composite molding to be produced and which can be brought independently of each other in time and independently of an optionally present center pin, into filling position and into pre-compacting position and which in order to obtain the final compacting, can be moved simultaneously with speeds adapted to each other in such a manner that the plugs reach their corresponding press end position at the same time.

Preferably, the top plug surface is divided, in similar manner to the bottom plug surface, into a plurality of top plugs which can be moved independently of each other for the pre-compacting and simultaneously for the final compacting.

The invention also includes an electronic control for controlling the top and bottom plugs.

DETAILED DESCRIPTION OF THE PREFERRED EMBODIMENTS

Figure 1:
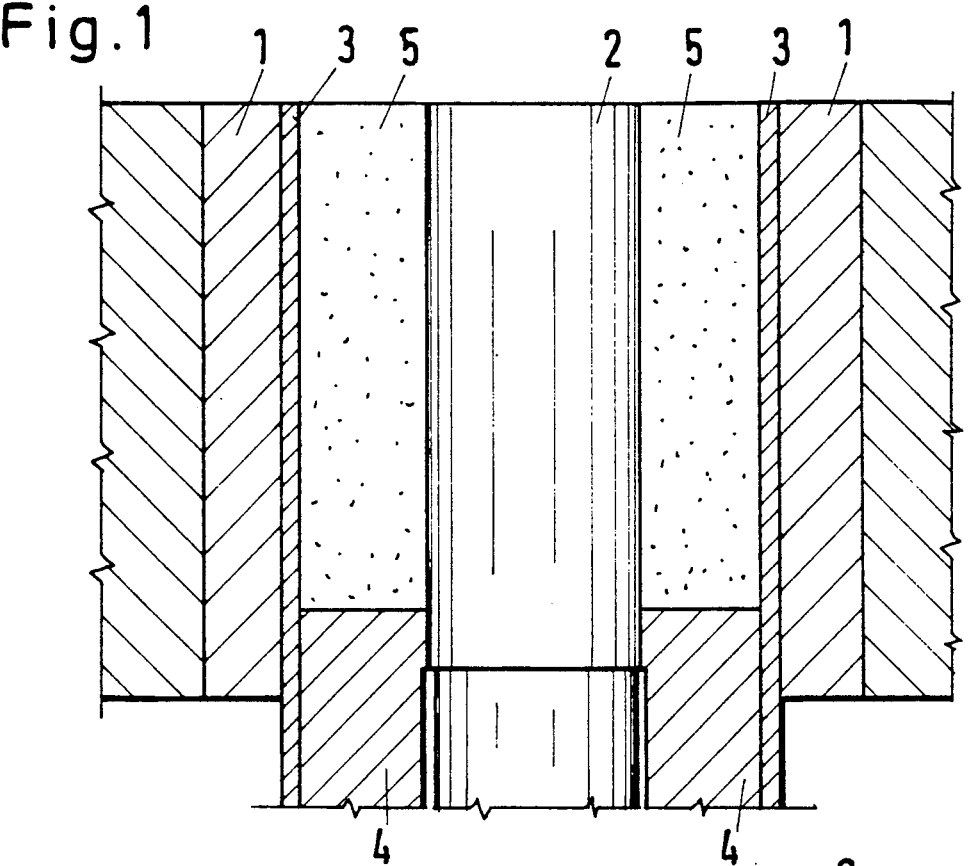
FIGS. 1–6 are cross-sectional views of the apparatus in accordance with the invention, illustrating the movement of the plugs and center pin thereof during operation.

In accordance with the inventive method, in a first step only that part of the mold space in the press mold which is to be filled by one of the powdered materials of the finished composite part to be produced is freed. The other parts of the mold space are blocked off by the lower plug which is introduced into the matrix. The powdered material introduced into the free part of the mold is then compacted to such an extent by the action of the top and bottom plugs of the press such that a partial molded body of sufficient dimensional stability is produced. This means that the partial molded body must not be destroyed upon the moving back of the press plugs but must remain undamaged in the matrix. A green strength within the range of about 5 to 10

N/mm² has proven suitable. Lower green strengths may mean a disintegration of the partial molding while, with higher green strengths, the homogeneous bonding of the partial molding to the powder material of the composite material adjoining it may be impaired.

In a second step, a part of the mold space which lies directly along the partial molding is freed by the corresponding moving back of one or more bottom plugs for the filling, in a defined position of filling, with a different powder material. The filling position of the bottom plug depends in each case, on the one hand, on the height of the molded part required at the place in question (geometry of the parts) and, on the other hand, on the filling density of the corresponding powder material and, finally, also, on the desired density of the compact or of the sintered finished part in the individual layers of material. The newly introduced powder material is then also pre-compacted in corresponding manner. This process can, if necessary, be repeated several times in order to build up additional layers of the composite molded body arranged alongside of each other. After production of the last layer, the pre-compacted powder materials present in the mold are compressed as a whole to the final shape of the compact with simultaneous action of all bottom and top plugs. When steel materials are used, this, as a rule, means a final density of about 6.4–6.8 g/cm³. In particular in the case of parts which are subjected to high mechanical stresses, higher final densities may also be desired. It is of course also possible to effect the final compacting in the case of individual press plugs with a different degree of compaction in order to specifically establish certain definite densities. In every case, however, constant density is obtained, as seen over the height of the molding, in the individual zones of material associated with a press plug. Upon the effecting of the final compacting, the speeds of the individual press plugs are so adjusted or set with respect to each other that the corresponding pressing end positions are reached simultaneously. After the removal of the compact from the mold, it is sintered, the intimate connection between the individual layers of the composite molding which was produced already upon the pressing being finally solidified.

The different stages of the pressing cycle for the manufacture of a simple compact are shown in FIGS. 1 to 6 in the form of cross-sectional views through a mold.

The compact produced is a hollow cylinder of a base material having an outer covering layer of another powder material. The method of pressing described below is referred to as a counter-pressing method. The matrix withdrawal method can also be used in corresponding fashion.

In FIG. 1 the filling position for the filling of the base material 5 which constitutes the predominant part of the composite molding is shown.

Figure 2:
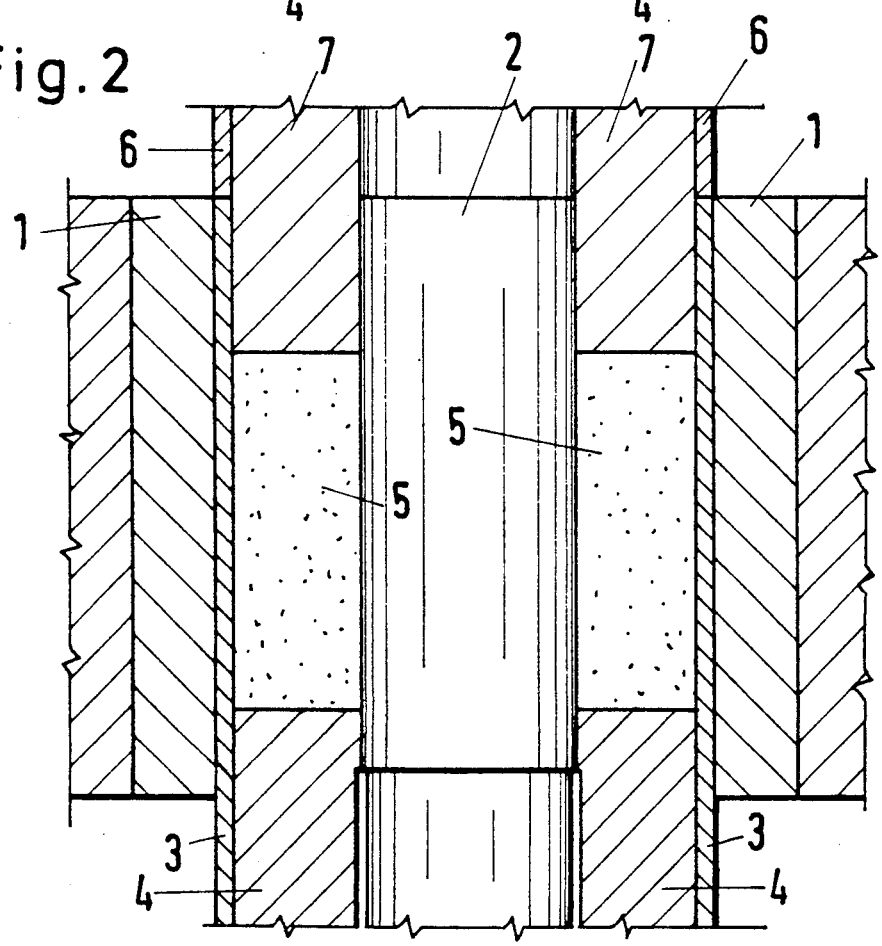

The mold includes a matrix 1, a cylindrical core 2, an outer bottom plug 3, an inner bottom plug 4 and (as shown in FIG. 2) an outer top plug 6 and an inner top plug 7. All four plugs, 3, 4, 6 and 7 along with the core 2, are independently axially movable relative to each other. While the inner bottom plug 4 is in its bottom filling position, the outer bottom plug 3 as well as the cylindrical core 2 (center pin) has its upper end surface flush with the upper edge of the matrix 1 of the mold.

Figure 3:
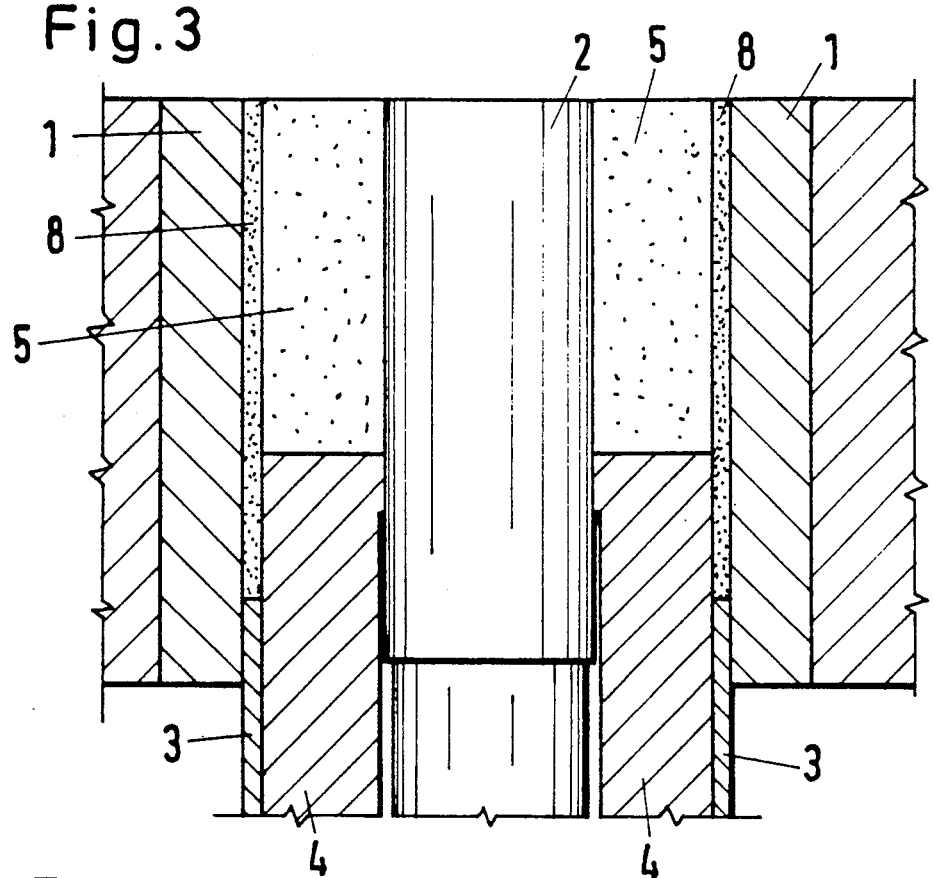

A filling system (not shown) can therefore in known manner travel over the filling space formed between the core 2 and the outer bottom plug 3 and fill the filling space with the base material 5 so that its surface is flush. Thereupon, while the matrix 1, the outer bottom plug 3 and the core 2 remain fixed in position, the bottom plug 4 is lowered slightly in order to move the inner top plug 7 (FIG. 2) down and permit it to dip from above into the mold space. The plugs 4 and 7 are then pressed uniformly in opposite directions into the base material 5 which has been introduced in order to pre-compact it to such an extent that a partial molding of base material 5 of sufficient dimensional stability is produced which does not break apart when, as is shown in FIG. 3, the outer bottom plug 3 is withdrawn in downward direction in order to come into its filling position. The partial molding of base material 5 is, in this connection, moved with its upper end surface flush with the end surface of the matrix 1. Between the matrix 1 and the outer wall surface of the partial molding of base material 5 as well as of the inner bottom plug 4 which is adjacent its bottom, a second filling space is thereby produced, which space is filled flush with the surface by a second filling system (also not shown) with the other powder material 8.

Figure 4:
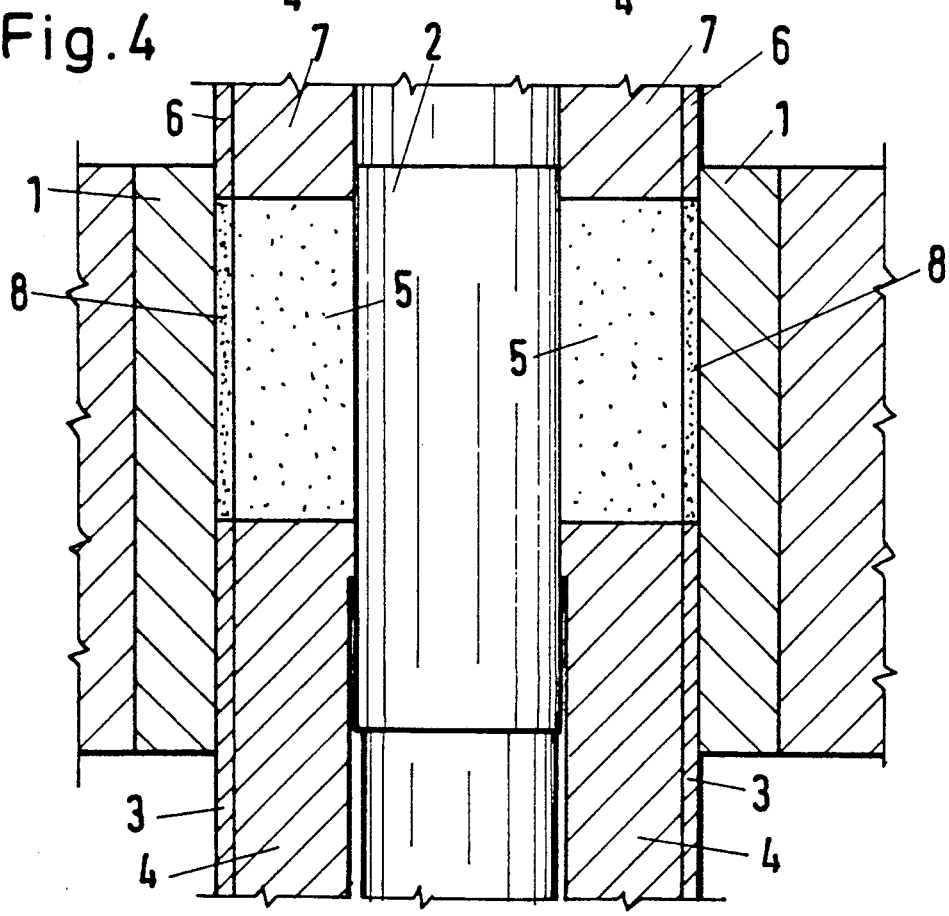
Figure 5:
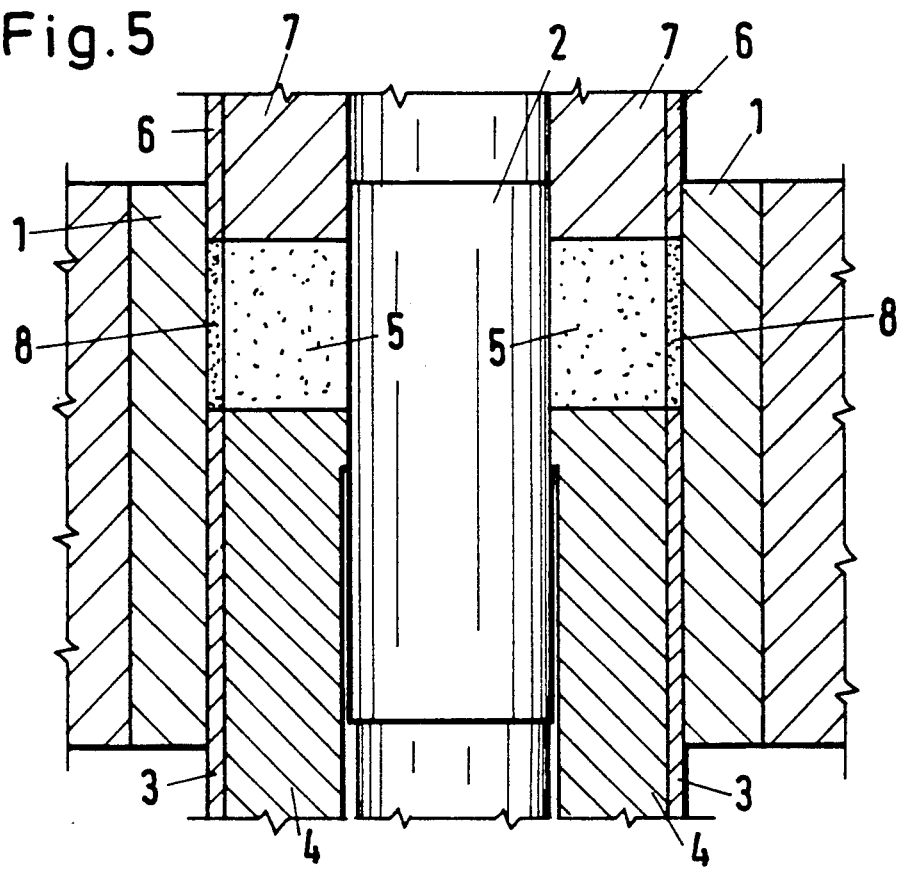
Figure 6:
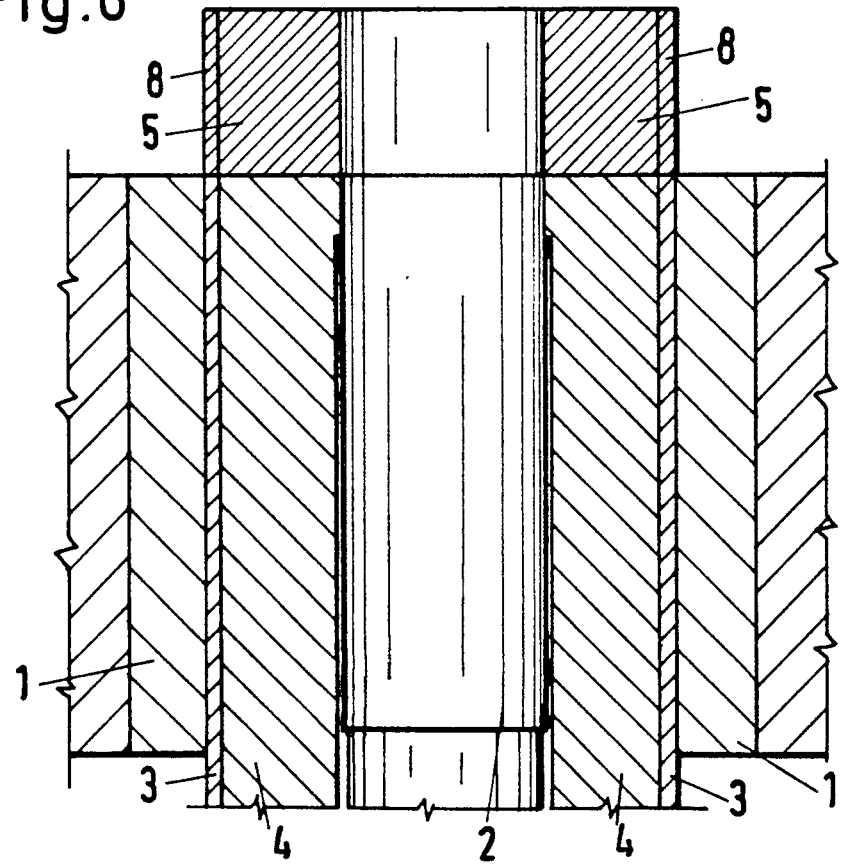

Thereupon, the two bottom plugs 3 and 4 are together lowered slightly in order to permit the two top plugs 6 and 7 to enter into the opening of the matrix 1. The outer bottom plug 3 is then moved upward flush with the bottom plug 4 so that the powder material 8 experiences approximately the same pre-compacting as the partial molding of base material 5 (FIG. 4). Only then is the final compacting of the compact effected (FIG. 5) in the manner that the two top plugs 6 and 7 and the two bottom plugs 3 and 4 are moved towards each other up into the final pressing position, with the matrix 1 stationary and the core 2 unmoved. After the moving back of the two top plugs 6 and 7, the matrix 1 and the core 2 are together pulled downward, with the lower plugs 3 and 4 stationary so that the compact 5, 8 formed is freed. It can then be sintered to form a finished part.

Although a very simple part has been selected for the embodiment described, a number of modifications are possible even in this case within the scope of the invention. Thus, for instance, the two top plugs 6 and 7 could also be combined to form a single top plug. In such case, in order to produce the partial molding of base material 5 during the pre-compacting, the outer bottom plug 3 would be moved downward with the top plugs 6, 7 abutting against it.

In order to obtain a pre-compacting which is as uniform as possible in the case of the powder material 8 as well as in the case of the base material 5 in the manner that the top plug 6 is moved by the same distance into the powder material 8 as the bottom plug 3 is, the top plug 7 could, in the present example, before the start of the pre-compacting and after introduction of the top plug 6 and 7 into the matrix 1, be moved downward, together with the bottom plug 4 and possibly together with the core 2, until the positively entrained partial molding of base material 5 has reached a symmetrical vertical position with respect to the powder column 8. If a compact is to be produced in which the different layers of material have a gradation in height with respect to each other which, seen in the direction of the pressing, may also be asymmetrical, then in order to obtain the same effect, the partial molding of base material 5 is moved within the matrix 1 until the center of gravity of the powder column 8 has reached, relative to the center of gravity of the partial molding of base material 5, a vertical position which corresponds to the desired vertical position of the two centers of gravity in the finally compacted compact. This procedure applies in corresponding fashion in the case of more than two layers of material.

Another variant, which has frequently been found to be particularly advantageous with respect to a uniform filling and compacting of the outer powder material 8 on the composite molding is that, first of all, the thin outer shell formed by powder material 8 of the composite molding be produced by pre-compacting and only then the powder of the base material 5 introduced and also pre-compacted.

The method of the invention is excellently suited also for the manufacture of moldings of complicated shape, such as, for instance, gear wheels. In the case of a spur gear, use is made for the outer gear rim, for instance, of a high-alloy steel powder which assures the best possible resistance to wear, while the inner body of the wheel is produced from a low-alloy or unalloyed steel powder which, accordingly, is much cheaper. The matrix of the mold in such case does not have a simple smooth cylindrical shape but has the negative shape of the toothing desired. The wheel body need not have the shape of a smooth disk but, with suitable distribution of top and bottom plugs and suitable shaping of the pressing surface, may have practically any desired shape.

Instead of an outer toothing, it is also possible to produce an inner toothing in the manner that the tooth profile is worked into the core of the mold. After the sintering, the moldings produced in this manner already represent finished parts which, in general, do not require any substantial machining. Gear wheels which have been produced in the manner described with an unalloyed base body and a high-alloy gear rim have not only outstanding concentricity, but also excellent mechanical strength, which make them suitable also for cases of use under high mechanical stress without the workpieces having to be first of all subjected to an expensive ennobling treatment such as, for instance, forging.

The invention can be used to particular advantage for the manufacture of layer composite bodies which consist of a metallic base body and are formed in given zones of oxidic or carbide materials in order to be able, for instance, to satisfy extreme demands as to resistance to wear. Examples of this are cutting tools with cutting edges of carbide metal. Another promising field of use resides in the combination of traditional materials with memory metals in order, for instance, to obtain a sensor function by means of the memory effect.

The obtaining of compressions which are as high and uniform as possible is desirable primarily in the manufacture of composite moldings each of the layers of which consist of steel materials. Intentionally differently established degrees of compression can be advantageous, particularly in case of the combination of materials of different type (for instance, steel and oxidic or carbide materials) in order, for instance, to counteract negative effects of the different heat expansion of the layers upon the sintering of the compacts.

Additionally, while the matrix 1, core 2 and plugs 3, 4, 6 and 7 of the mold have been shown as essentially cylindrical, they may independently take on any desired geometric shapes including triangles, squares, polygons, etc. Also, while the relationship of the matrix 1, and plugs 3, 4, 6 and 7 has been shown as being concentric, about the axis which is defined by the core 2, it is contemplated that the matrix 1 and/or any of plugs 3, 4, 6 and 7 may be eccentrically displaced in the radial direction relative to the axis of the core 2.

It is also conceivable that the wall thickness of the plugs 3, 4, 6 and 7 need not be constant. Thus, if desired, moldings in which one or more layers have a preselected variable thickness in the radial direction can be advantageously obtained.

It should be understood that the preferred embodiments and examples described are for illustrative purposes only and are not to be construed as limiting the scope of the present invention which is properly delineated only in the appended claims.

We claim:

1. A method for manufacturing composite moldings from at least two materials in a press-molding apparatus having a matrix having an upper end surface, and at least two axially displaceable bottom plugs each of which has a pressing surface, the matrix defining a mold cavity and the apparatus also including at least two top plugs opposite the bottom plugs and having a pressing surface corresponding to the pressing surface of the respective opposite bottom plug and which, along with the bottom plugs, are configured for vertical displacement within the mold cavity, said method comprising the steps of:

a) partially retracting a bottom plug from the mold cavity to create a void therein for receiving a powder material;

b) filling the void created in step (a) with the powder material;

c) pressing the top and bottom plugs relative to the matrix towards one another in the part of the mold cavity filled by the powder material in step (b) to form a pre-compacted partial molding having an upper end surface;

d) making the upper end surface of the partial molding flush with the upper end surface of the matrix;

e) repeating steps (a) through (d) using a next adjacent bottom plug to create an adjacent void for filling with another powder material, steps (a) through (d) being repeated as many times as necessary to make a composite molding having the desired number of layers composed of different materials with the proviso that after the introduction of another powder material in step (b) and before the pre-compacting thereof in step (c), the top and bottom plugs corresponding to the pre-compacted partial molding are so displaced together in regulated manner, resting against the end surfaces of the partial molding, until the center of gravity of the partial molding has reached a position in height relative to the center of gravity of the powder column of the other powder material, which corresponds to the desired position in height of the two centers of gravity with respect to each other in the finally compacted molding, and that only thereupon is the pre-compacting effected, the top and bottom plugs corresponding to the column of powder of the other powder material being moved in each case by the same path into the column of powder; and f) after the last layer of powder material has been pre-compacted, subjecting all of the pre-compacted partial moldings as a whole, to final compaction by pressing the top and bottom plugs toward one another.

2. The method according to claim 1, wherein in order to obtain the same relative compacting in the different layers of material of the finally compacted compact, each of which has the same molding height, the bottom plug, which up to that time filled the mold cavity intended for the second or further powder material, is brought with its pressing surface into a filling position below the upper end surface of the pre-compacted partial molding.

3. A method according to claim 2 for producing finished parts of substantial symmetry of rotation, having a thick-walled inner hollow cylindrical annular body of the base material and a comparatively thin-walled annular body of another material surrounding base, wherein the filling volume of the outer annular body is filled and pre-compacted and only thereupon is the filling volume of the other annular body filled and also pre-compacted.

4. A method according to claim 1 for producing finished parts of substantial symmetry of rotation, having a thick-walled inner hollow cylindrical annular body of the base material and a comparatively thin-walled annual body of another material surrounding same, wherein the filling volume of the outer annular body is filled and pre-compacted and only thereupon is the filling volume of the other annular body filled and also pre-compacted.

5. The method according to claim 1 wherein one of the powder materials is a base material which is an unalloyed or low-alloy steel powder and another powder material is a high-alloy steel powder or an oxide or carbide embedded in a metallic matrix or a memory metal.

6. An apparatus for producing composite moldings, comprising: a press mold which comprises at least two top plugs, at least two bottom plugs adjacent the top plugs forming at least two corresponding pairs of plugs and a matrix into which said at least two top plugs and said at least two bottom plugs can be introduced for the compacting of the composite moldings, said at least two top and bottom plugs each having a pressing surface which corresponds to the respective pressing surface of the corresponding bottom and top plugs, the respective pressing surfaces of a pair of top and bottom plugs corresponding to a predetermined cross-sectional area of a given powder column of one of the materials of the composite molding to be produced, said press mold further including displacement means for moving said top and bottom plugs independently of each other in time into filling position and into pre-compacting position; and means for moving said top and bottom plugs into final compacting position, by moving said plugs simultaneously with speeds adapted to each other in such a manner that said at least two bottom plugs and said at least two top plugs reach their corresponding press end position at the same time.

7. The apparatus according to claim 6, wherein said displacement means comprises an electronic control for the controlling of the relative movement of said top and bottom plugs.

8. The apparatus according to claim 6, additionally comprising means for displacing the top and bottom plugs corresponding to the pre-compacted partial molding together in regulated manner, resting against the end surfaces of the partial molding, until the center of gravity of the partial molding has reached a predetermined position in height relative to the center of gravity of the powder column of the other powder material, and means for moving the top and bottom plugs corresponding to the column of powder of the other powder material in each case by the same path into the column of powder.

* * * * *